US008000730B2

(12) United States Patent
Sayeed et al.

(10) Patent No.: US 8,000,730 B2
(45) Date of Patent: Aug. 16, 2011

(54) METHOD AND SYSTEM FOR IMPROVING PERFORMANCE IN A SPARSE MULTI-PATH ENVIRONMENT USING RECONFIGURABLE ARRAYS

(75) Inventors: Akbar M. Sayeed, Madison, WI (US); Vasanthan Raghavan, Champaign, IL (US)

(73) Assignee: Wisconsin Alumni Research Foundation, Madison, WI (US)

( * ) Notice: Subject to any disclaimer, the term of this patent is extended or adjusted under 35 U.S.C. 154(b) by 747 days.

(21) Appl. No.: 11/482,530

(22) Filed: Jul. 7, 2006

(65) Prior Publication Data

US 2008/0009321 A1 Jan. 10, 2008

(51) Int. Cl.

*H04B 15/00* (2006.01)
*H04M 1/00* (2006.01)
*H04B 1/06* (2006.01)

(52) U.S. Cl. .................. 455/506; 455/562.1; 455/575.7; 455/129; 455/272; 455/273

(58) Field of Classification Search .................. 455/506, 455/562.1, 575.7, 129, 272, 273
See application file for complete search history.

(56) References Cited

U.S. PATENT DOCUMENTS 5,204,981 A * 4/1993 Karasawa et al. .......... 455/277.1
6,292,138 B1 * 9/2001 Choi ............................ 342/458
7,283,499 B2 * 10/2007 Priotti et al. .................. 370/334
7,411,517 B2 * 8/2008 Flanagan ................... 340/854.4
2003/0083016 A1 * 5/2003 Evans et al. .................. 455/67.1
2004/0067775 A1 * 4/2004 Dalal et al. ................. 455/562.1
2005/0265470 A1 * 12/2005 Kishigami et al. ............ 375/267
2006/0028375 A1 * 2/2006 Honda et al. ..................... 342/70
2007/0224949 A1 * 9/2007 Morton et al. ................ 455/101
2007/0258392 A1 * 11/2007 Larsson et al. ................ 455/101

OTHER PUBLICATIONS

Sayeed, et al. Capacity of Space-Time Wireless Channels: A Physical Perspective. ITW2004, San Antonio, Texas, Oct. 24-29, 2004.
Sayeed, et al. Deconstructing Multiantenna Fading Channels. IEEE Transactions on Signal Processing, vol. 50, No. 10, Oct. 2002.
Barriac, et al. Space-Time Communication for OFDM with Implicit Channel Feedback. University of California, Santa Barbara, Dec. 11, 2003.

* cited by examiner

*Primary Examiner* — Wen Huang
(74) *Attorney, Agent, or Firm* — Bell & Manning, LLC

(57) ABSTRACT

A wireless communication system supporting improved performance in a sparse multi-path environment is provided that uses spatially reconfigurable arrays. The system includes a first device and a second device. The first device includes a plurality of antennas and a processor operably coupled to the plurality of antennas. The plurality of antennas are adapted to transmit a first signal toward a the second device and to receive a second signal from the second device. The processor is configured to determine an antenna spacing between the plurality of antennas based on an estimated number of spatial degrees of freedom and an estimated operating signal-to-noise ratio. The second device includes a receiver adapted to receive the first signal from the first device, a transmitter adapted to transmit the second signal toward the first device, and a processor. The processor estimates the number of spatial degrees of freedom and the operating signal-to-noise ratio from the received first signal.

24 Claims, 8 Drawing Sheets

METHOD AND SYSTEM FOR IMPROVING PERFORMANCE IN A SPARSE MULTI-PATH ENVIRONMENT USING RECONFIGURABLE ARRAYS

REFERENCE TO GOVERNMENT RIGHTS

This invention was made with United States government support awarded by the following agencies: NSF 0431088. The United States government has certain rights in this invention.

FIELD OF THE INVENTION

The subject of the disclosure relates generally to multi-antenna wireless communication systems. More specifically, the disclosure relates to a method and a system providing improved performance in a multi-antenna wireless communication system in a sparse multi-path environment using reconfigurable arrays.

BACKGROUND OF THE INVENTION

Antenna arrays hold great promise for bandwidth-efficient communication over wireless channels. Past studies have indicated a linear increase in capacity with the number of antennas. However, the research on multiple input, multiple output (MIMO) wireless communication systems was initially performed in rich multi-path environments and there is growing evidence that physical wireless channels exhibit a sparse structure even using relatively small antenna dimensions. The two main characteristics of fading spatial multi-path channels from a communication theoretic viewpoint are the capacity and the diversity afforded by the scattering environment. Two key factors affect the capacity: the number of parallel channels and the level of diversity associated with each parallel channel. The capacity and diversity of the spatial multi-path channel are determined by the richness (or sparseness) of multi-path.

Antennas have historically been viewed as static and passive devices with time-constant characteristics. After finalizing an antenna design, its operational characteristics remain essentially unchanged during system use. Technological advances in reconfigurable antenna arrays, however, are enabling new wireless communication devices in which the array configuration can be adapted to changes in the communication environment. Thus, understanding the impact of reconfigurable arrays on MIMO capacity and developing strategies for sensing and adapting to the environment is of significant interest. Thus, what is needed is a method of determining an antenna spacing in a reconfigurable antenna array that supports increased capacity based on the sensed multi-path environment. What is additionally needed is a method that supports increased capacity over the entire operational signal-to-noise ratio (SNR) range.

SUMMARY OF THE INVENTION

An exemplary embodiment provides a wireless communication system supporting improved performance in a sparse multi-path environment using spatially reconfigurable arrays. Capacity is increased in sparse multi-path environments by systematically adapting the antenna spacing of a reconfigurable antenna array at the transmitter and/or at the receiver based on the level of sparsity of the multi-path environment and the operating SNR. Furthermore, three canonical array configurations can provide near-optimum performance over the entire SNR range.

The system includes, but is not limited to, a first device and a second device. The system includes a first device and a second device. The first device includes a plurality of antennas and a processor operably coupled to the plurality of antennas. The plurality of antennas are adapted to transmit a first signal toward a the second device and to receive a second signal from the second device. The processor is configured to determine an antenna spacing between the plurality of antennas based on an estimated number of spatial degrees of freedom and an estimated operating signal-to-noise ratio. The second device includes a receiver adapted to receive the first signal from the first device, a transmitter adapted to transmit the second signal toward the first device, and a processor. The processor estimates the number of spatial degrees of freedom and the operating signal-to-noise ratio from the received first signal Another exemplary embodiment of the invention comprises a method of determining an antenna spacing in a multi-antenna system. The method includes, but is not limited to, estimating a number of spatial degrees of freedom associated with a channel; estimating an operating signal-to-noise ratio associated with the channel; and determining an antenna spacing between a plurality of antennas based on the estimated number of spatial degrees of freedom and the estimated operating signal-to-noise ratio associated with the channel.

Yet another exemplary embodiment of the invention includes computer-readable instructions that, upon execution by a processor, cause the processor to determine an antenna spacing in a multi-antenna system. The instructions are configured to determine an antenna spacing between a plurality of antennas based on a number of spatial degrees of freedom estimated for a channel and an operating signal-to-noise ratio estimated for the channel.

Still another exemplary embodiment of the invention includes a device including a plurality of antennas and a processor operably coupled to the plurality of antennas. The plurality of antennas are adapted to transmit a first signal toward a receiver and to receive a second signal from the receiver. The processor receives the second signal from the plurality of antennas and is configured to identify a number of spatial degrees of freedom from the received second signal; to identify an operating signal-to-noise ratio; and to determine an antenna spacing between the plurality of antennas based on the identified number of spatial degrees of freedom and the identified operating signal-to-noise ratio.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION OF THE EXEMPLARY EMBODIMENTS

Figure 1:
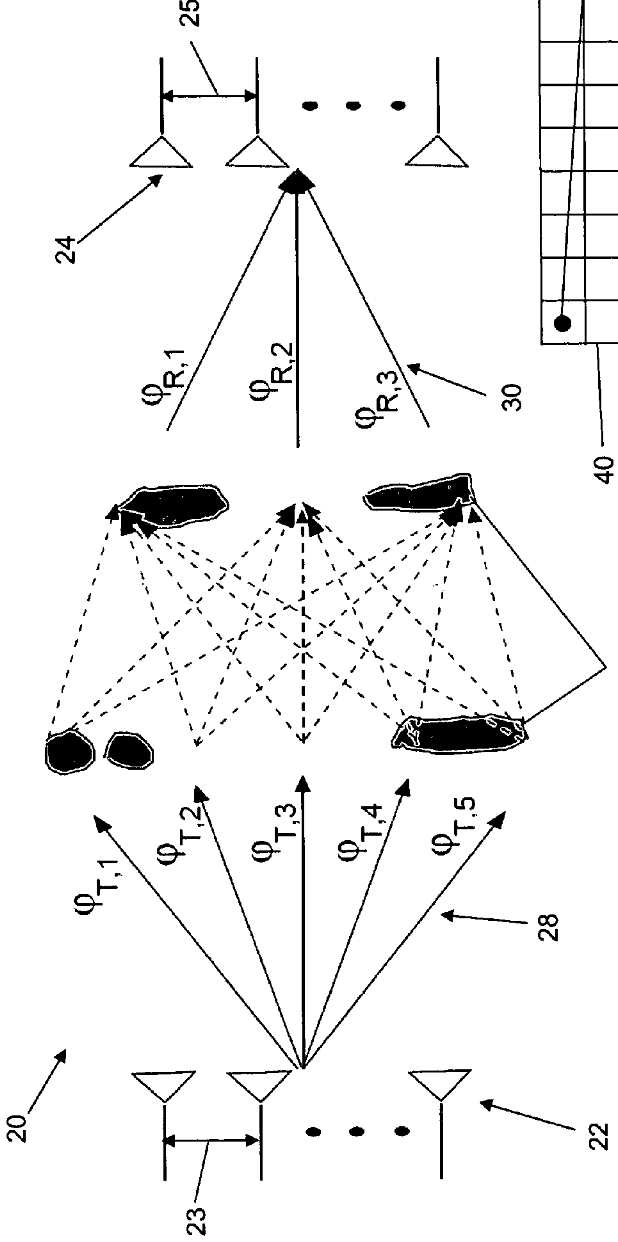
FIG. 1 depicts a virtual representation of a communication system in accordance with an exemplary embodiment.

With reference to FIG. 1, a virtual representation of a communication system 20 is shown. Communication system 20 may include a first plurality of antennas 22 at a first device and a second plurality of antennas 24 at a second device. The number of antennas of the first plurality of antennas 22 may be different from the number of antennas of the second plurality of antennas 24. The first plurality of antennas 22 may be of the same type of antenna as the second plurality of antennas 24 or of a different type as the second plurality of antennas 24. In the exemplary embodiment of FIG. 1, the first plurality of antennas 22 is arranged in a uniform linear array. The first plurality of antennas 22 and/or the second plurality of antennas 24 may be arranged to form a uniform or a non-uniform linear array, a rectangular array, a circular array, a conformal array, etc. An antenna of the first plurality of antennas 22 and/or the second plurality of antennas 24 may be a dipole antenna, a monopole antenna, a helical antenna, a microstrip antenna, a patch antenna, a fractal antenna, etc. The first plurality of antennas 22 and/or the second plurality of antennas 24 are reconfigurable antenna arrays that can be adjusted spatially, for example, using microelectromechanical system (MEMS) components RF switches, etc. Thus, a first antenna spacing 23 between the first plurality of antennas 22 can be adjusted. Additionally, a second antenna spacing 25 between the second plurality of antennas 24 can be adjusted. The first antenna spacing 23 may be the same as or different from the second antenna spacing 25. For array configurations other than uniform linear arrays, aspects of array configuration other than antenna spacing may be adjusted.

Multiple antenna arrays may be used for transmitting data in wireless communication systems. For example, multiple antennas may be used at both the transmitter and at the receiver as shown with reference to the exemplary embodiment of FIG. 1. Unfortunately, the relatively high dimensional nature of multiple antenna array systems results in a high computational complexity in practical systems. For a discussion of a virtual modeling method for modeling a scattering environment in a multiple antenna wireless communication system that has multiple transmitter elements and multiple receiver elements and a scattering environment with scattering objects located between the transmitter and receiver elements, see U.S. patent application Ser. No. 10/652,373, entitled a "METHOD AND SYSTEM FOR MODELING A WIRELESS COMMUNICATION CHANNEL," filed Aug. 29, 2003, the disclosure of which is incorporated herein by reference in its entirety.

A virtual channel representation that provides an accurate and analytically tractable model for physical wireless channels is utilized where H denotes an N×N virtual channel matrix representing N antennas at the transmitter and the receiver. The virtual representation is analogous to representing the channel in beamspace or the wavenumber domain. Specifically, the virtual representation describes the channel with respect to spatial basis functions defined by virtual fixed angles that are determined by the spatial resolution of the arrays. With reference to FIG. 1, a schematic illustrating the virtual modeling of the physical channels between the first device and the second device is shown. The channels are characterized by virtual channel coefficients, $H_v(m,n)=h_{m,n}$, that couple the fixed virtual transmit angles, $\theta_{t,n}$, with the fixed virtual receive angles, $\theta_{r,m}$. The normalized angles $\theta$ are related to the physical angles of arrival/departure $\phi$ as $\theta=d\sin(\phi)/\lambda$, where d is the respective antenna spacing and $\lambda$ is the wavelength of propagation. The transmit physical angles 28, $\phi_{t,n}$, encounter scatterers 26 resulting in receive physical angles 30, $\phi_{r,m}$.

Figure 2:
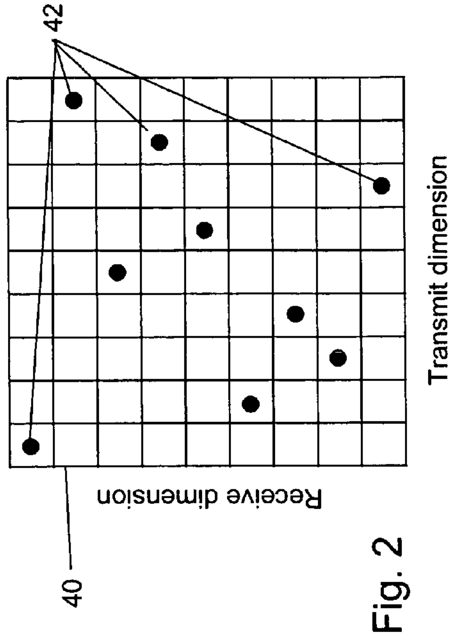
FIG. 2 is a diagram of a sparse 9×9 virtual channel matrix in accordance with an exemplary embodiment.

The dominant non-vanishing entries of the virtual channel matrix reveal the statistically independent degrees of freedom (DoF), D, in the channel, which also represent the number of resolvable paths in the scattering environment. For sparse channels, $D<N^2$. With reference to FIG. 2, an exemplary sparse virtual channel matrix 40 is shown. In the exemplary embodiment of FIG. 2, the first plurality of antennas 22 includes nine antennas, and the second plurality of antennas 24 includes nine antennas forming a 9×9 channel matrix 40. A dot 42 in channel matrix 40 represents a dominant, non-vanishing entry in the virtual channel matrix. In the exemplary embodiment of FIG. 2, only nine of the maximum possible 81 (9×9) virtual channel entries are non-vanishing.

A family of channels is described by two parameters (p,q), D=pq that represent different configurations of the $D<N^2$ DoF. For all feasible (p,q), the MIMO capacity of the corresponding channel configuration is accurately approximated by $$C(N,\rho,D,p)\approx p\log(1+\rho D/p^2) \quad (1)$$

where $\rho$ denotes the transmit SNR (can be interpreted as the nominal received SNR if an attenuation factor is included to reflect path loss relating the total power at the receiver to the total transmitted power), p represents the multiplexing gain (MG) or the number of parallel channels (number of independent data streams transmitted at the transmitting communication device), q represents the DoF per parallel channel, and $\rho D/p^2=\rho_{rx}$ denotes the received SNR per parallel channel. From equation (1), increasing p comes at the cost of $\rho_{rx}$ and vice versa. Based on an analysis of equation (1), on one extreme, beamforming channels (BF) in which the channel power is distributed to maximize $\rho_{rx}$ at the expense of p result, and, on the other extreme, multiplexing channels (MUX) which favor p over $\rho_{rx}$ result. The ideal channel (IDEAL) lies in between and corresponds to an optimal distribution of channel power to balance p and $\rho_{rx}$. p reflects the number of independent data streams, and hence the rate of transmission, whereas $\rho_{rx}$ reflects the received SNR, and hence the reliability of decoding a particular data stream at the receiver. Maximizing capacity (maximum number of data streams that can be reliably communicated) involves optimally balancing p as a function of the operating SNR. The BF, MUX, and IDEAL configurations reflect the capacity-maximizing configurations at low, high, and medium SNRs, respectively. Precise values of low, high, and medium SNRs can be determined through measured channel parameters, such as the number of dominant non-vanishing virtual channel entries and the total average power contributed by the spatial multi-path channel (the sum of the average powers of the dominant non-vanishing virtual channel entries).

Figure 3:
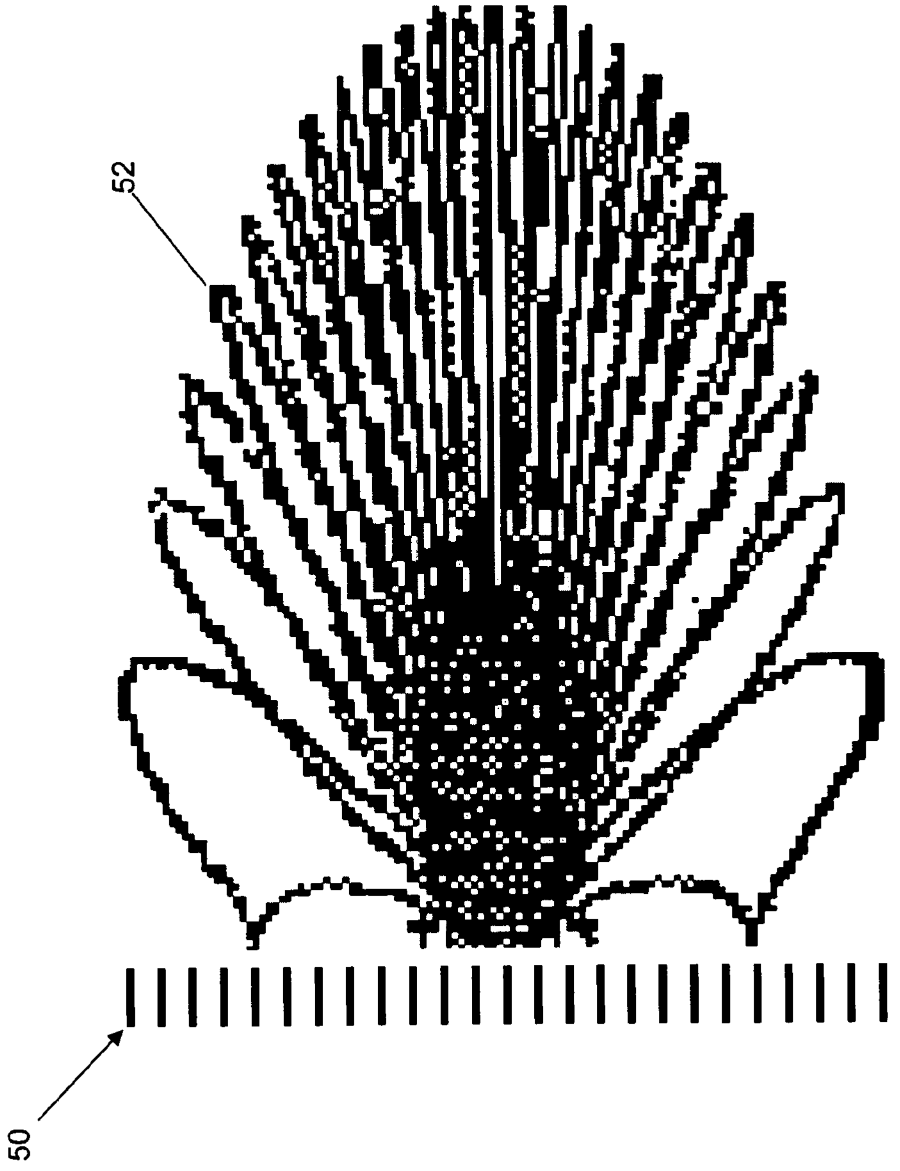
FIG. 3 is a diagram illustrating virtual beam directions in accordance with a first exemplary embodiment.
Figure 4:
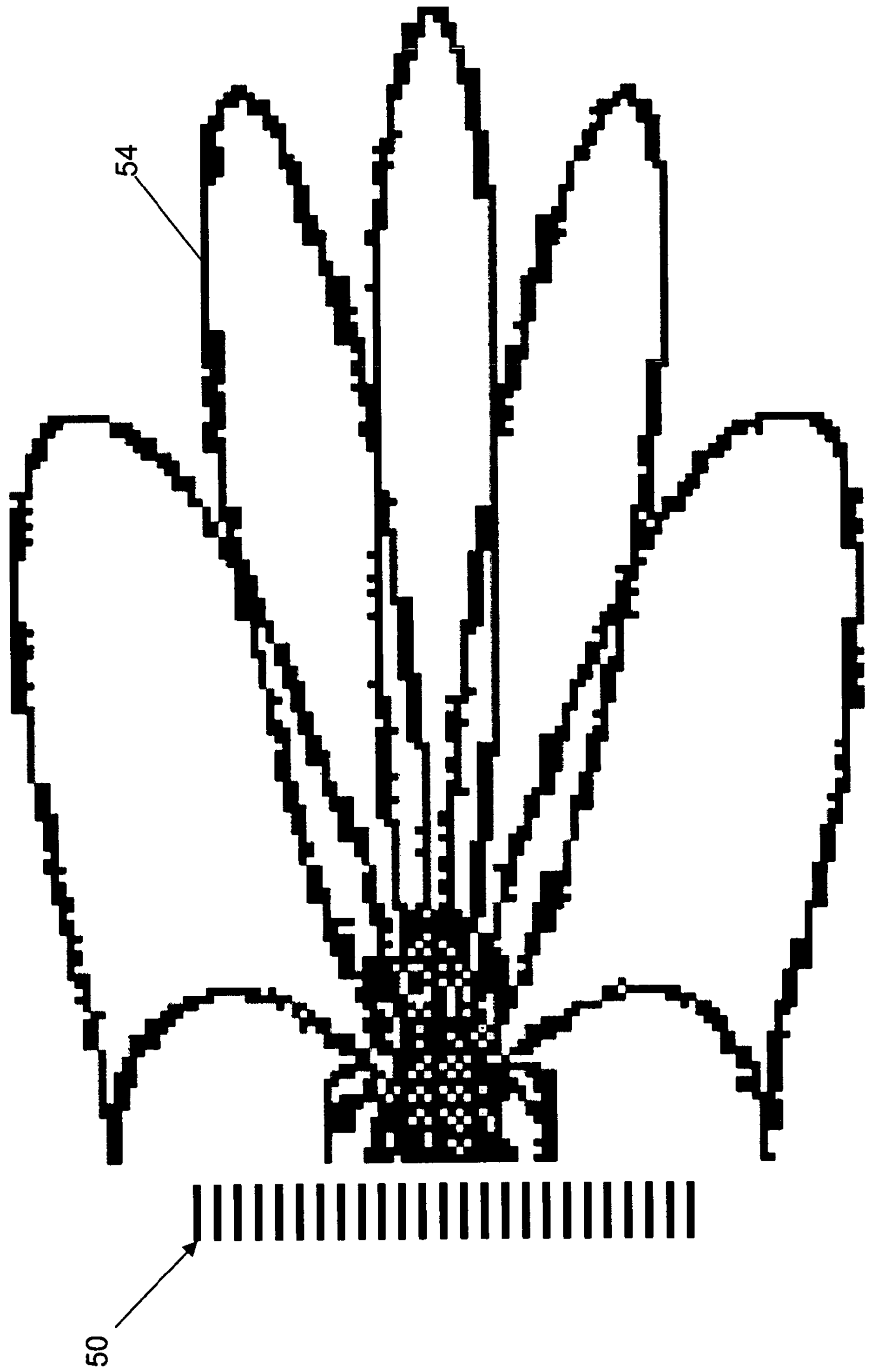
FIG. 4 is a diagram illustrating virtual beam directions in accordance with a second exemplary embodiment.
Figure 5:
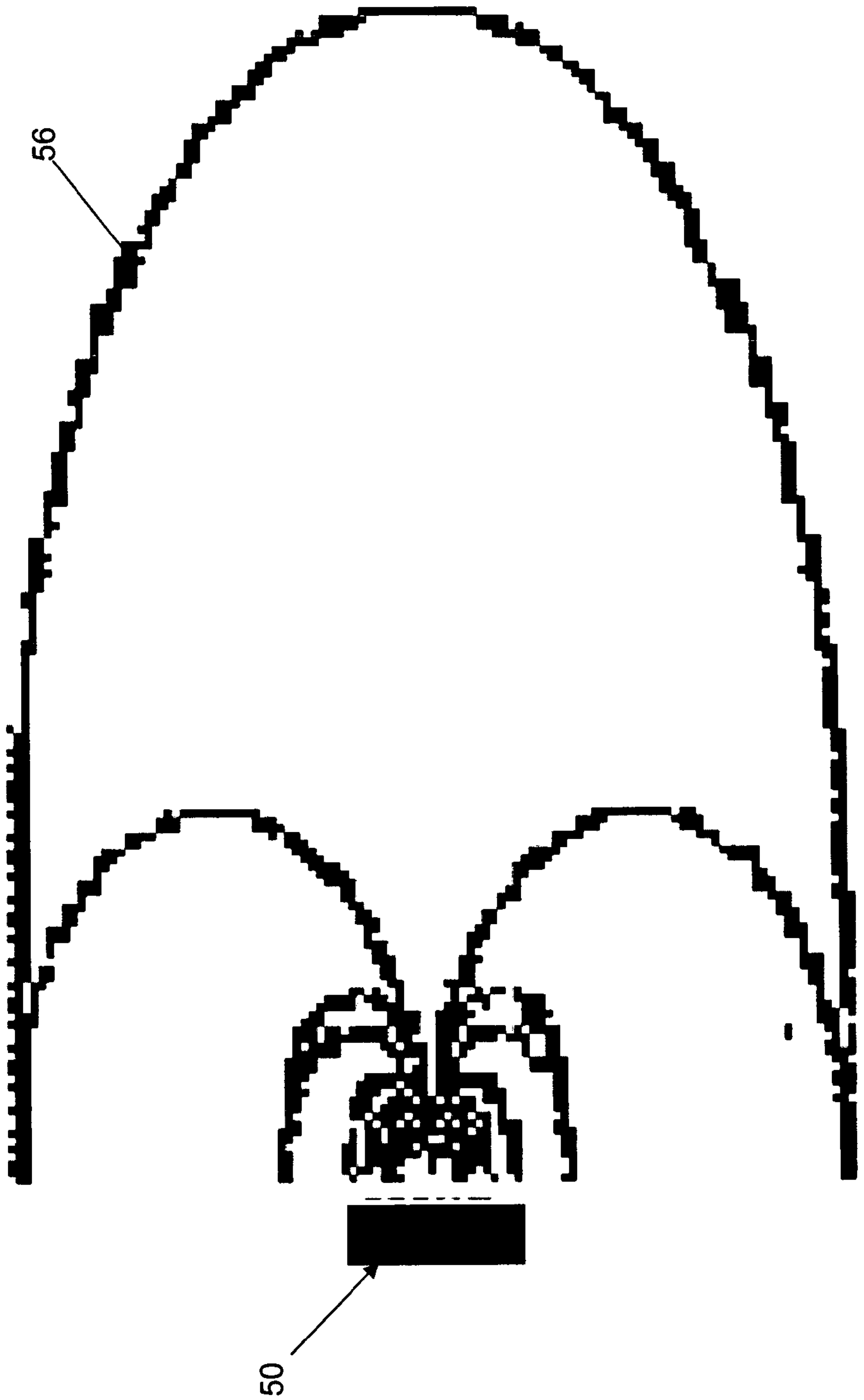
FIG. 5 is a diagram illustrating virtual beam directions in accordance with a third exemplary embodiment.

With reference to FIG. 3, a diagram illustrating first virtual beams 52 in accordance with a first exemplary configuration of a plurality of antennas 50 is shown. First virtual beams 52 are formed from the plurality of antennas 50 having a maximum antenna spacing and define a high-resolution array configuration. With reference to FIG. 4, a diagram illustrating second virtual beams 54 in accordance with a second exemplary configuration of the plurality of antennas 50 is shown. Second virtual beams 54 are formed from the plurality of antennas 50 having an intermediate antenna spacing and define a medium-resolution array configuration. With reference to FIG. 5, a diagram illustrating third virtual beams 56 in accordance with a third exemplary configuration of the plurality of antennas 50 is shown. Third virtual beams 56 are formed from the plurality of antennas 50 having a minimum antenna spacing and define a low-resolution array configuration. A MUX channel configuration is obtained when maximum antenna spacings (high resolution) are used at both the first (transmitting) device and the second (receiving) device (see FIG. 7*b*). An IDEAL channel configuration is obtained when medium antenna spacings (medium resolution) are used at both the first (transmitting) device and the second (receiving) device (see FIG. 8*b*). A BF channel configuration is obtained when a minimum antenna spacing (low-resolution) is used at the first (transmitting) device and a maximum antenna spacing (high-resolution) is used at the second (receiving) device (see FIG. 9*b*).

Figure 6:
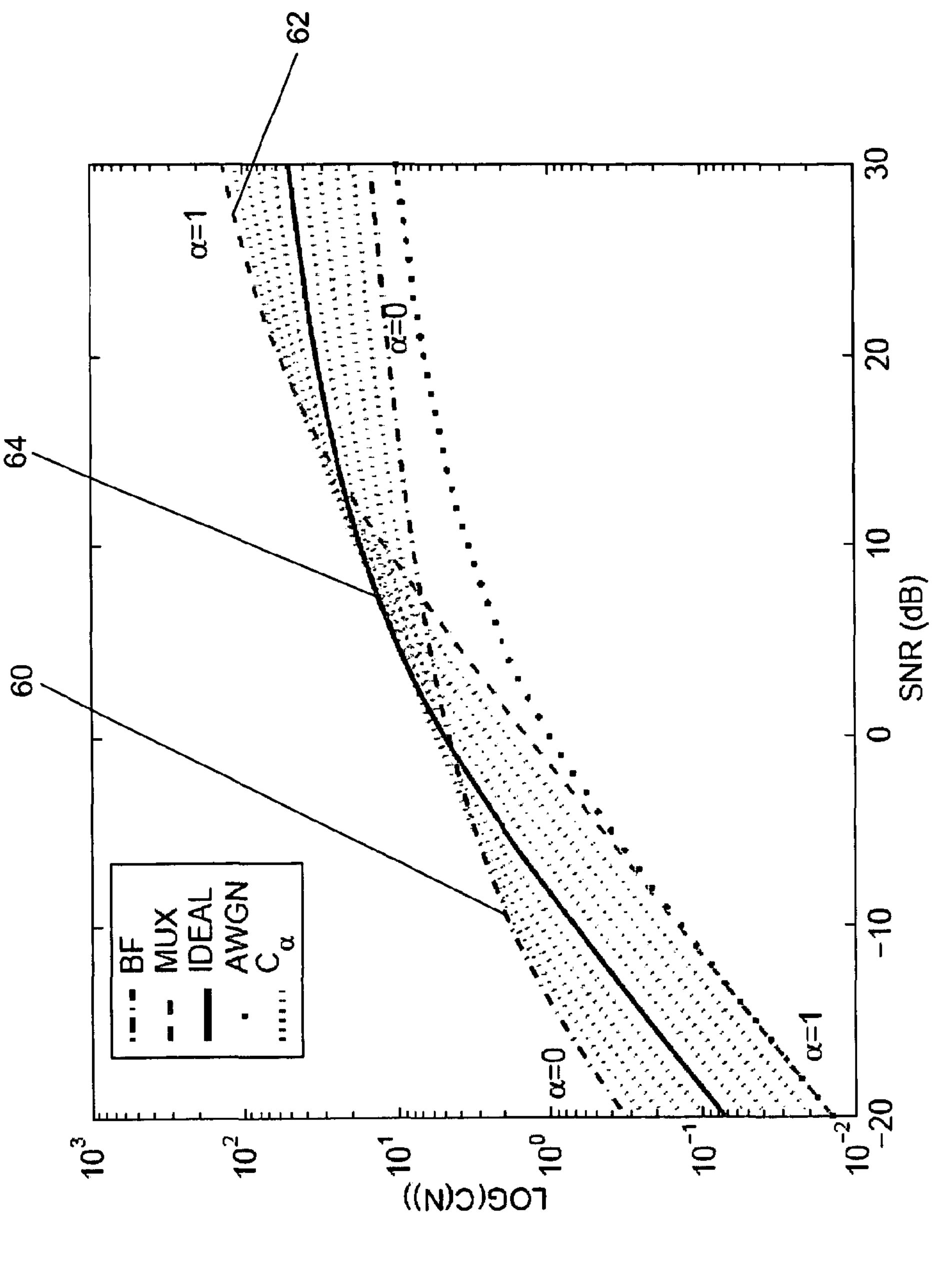
FIG. 6 is a graph illustrating a theoretical capacity of the communication system as a function of a signal-to-noise ratio for different channel configurations in accordance with an exemplary embodiment.

Three canonical antenna array configurations are sufficient for near-optimum performance over the entire SNR range as illustrated with reference to FIG. 6. A BF curve 60 shows the capacity for a BF configuration (p=1) that is optimal at low SNR, $\rho<\rho_{low}$, and is realized by closely spaced antennas at the transmitter as shown with reference to FIG. 5 and a sufficiently large antenna spacing at the receiver as shown with reference to FIG. 3. A MUX curve 62 shows the capacity for a MUX configuration (p=N) that is optimal at high SNR, $\rho>\rho_{high}$, and is realized by a sufficiently large antenna spacing at both the transmitter and the receiver as shown with reference to FIG. 3. An IDEAL curve 64 shows the capacity for an IDEAL configuration (1<p<N) that is optimal at, $\rho\in(\rho_{low}, \rho_{high})$ and is realized by an intermediate antenna spacing at both the transmitter and the receiver as shown with reference to FIG. 4. FIG. 6 also shows curves for $$C_\alpha = N^\alpha \log(1+\rho N^{\gamma-2\alpha}) \tag{2}$$

corresponding to $D(N)=N^\gamma$, $p(N)=N^\alpha$, and $q(N)=N^{\gamma-\alpha}$. $C_\alpha$ is plotted for 10 equally spaced values of $\alpha\in[0,1]$ for $\gamma=1$ and N=25. With reference to FIG. 6, $\rho_{low}\approx-6$ dB and $\rho_{high}\approx16$ dB and for each intermediate SNR, there is a $C_\alpha$ curve that yields the maximum capacity. As a result, as the SNR changes from a low value to a high value, the optimal distribution of channel DoFs changes from the beamforming configuration ($\alpha=\alpha_{min}$) into the multiplexing configuration ($\alpha=\alpha_{max}$) via the ideal channel ($\alpha=\gamma/2$).

In a single-user MIMO system with a uniform linear array of $N_t$ transmit and $N_r$ receive antennas. The transmitted signal s and the received signal x are related by x=Hs+n where H is the MIMO channel matrix and n is the additive white Gaussian noise (AWGN) at the receiver. A physical multi-path channel can be accurately modeled as $$H = \sum_{l=1}^{L} \beta_l a_r(\theta_{r,l}) a_t^H(\theta_{t,l}) \tag{3}$$

where the transmitter and receiver arrays are coupled through L propagation paths with complex path gains $\{\beta_l\}$, angles of departure (AoD) $\{\theta_{t,l}\}$ and angles of arrival (AoA) $\{\theta_{r,l}\}$. In equation (3), $\alpha_r(\theta_r)$ and $\alpha_t(\theta_t)$ denote the receiver response and transmitter steering vectors for receiving/transmitting in the normalized direction $\theta_r/\theta_t$, where $\theta$ is related to the physical angle (in the plane of the arrays) $\phi\in[-\pi/2,\pi/2]$ as $\theta=d\sin(\phi)/\lambda$, d is the antenna spacing and $\lambda$ is the wavelength of propagation. Both $\alpha_r(\theta_r)$ and $\alpha_t(\theta_t)$ are periodic in $\theta$ with period one.

The virtual MIMO channel representation characterizes a physical channel via coupling between spatial beams in fixed virtual transmit and receive directions $$H = \sum_{m=1}^{N_r} \sum_{n=1}^{N_t} H_v(m, n) a_r(\tilde{\theta}_{r,m}) a_t^H(\tilde{\theta}_{t,n}) = A_r H_v A_t^H \tag{4}$$

where $$\left\{\tilde{\theta}_{r,m} = \frac{m}{N_r}\right\} \text{ and } \left\{\tilde{\theta}_{t,n} = \frac{n}{N_t}\right\}$$

are fixed virtual receive and transmit angles that uniformly sample the unit $\theta$ period and result in unitary discrete fourier transform matrices $A_t$ and $A_r$. Thus, H and $H_v$ are unitarily equivalent: $H_v=A_r^H H A_t$. The virtual representation is linear and is characterized by the matrix $H_v$.

Virtual path partitioning relates the virtual coefficients to the physical paths gains $$H_v(m, n) \approx \left[\sum_{l\in S_{R,m}\cap S_{T,n}} \beta_l\right] \tag{5}$$

where $S_{r,m}$ and $S_{t,n}$ are the spatial resolution bins of size $1/N_r$ and $1/N_t$ corresponding to the m-th receive and n-th transmit virtual angle. Thus, $H_v(m,n)$ is approximately the sum of the gains of all paths whose transmit and receive angles lie within the (m, n)-th resolution bin. If there are no paths in a particular resolution bin, the corresponding $H_v(m,n)\approx0$. Each $H_v(m,n)$ is associated with a disjoint set of physical paths and is approximately equal to the sum of the gains of the corresponding paths. It follows that the virtual channel coefficients are approximately independent. The virtual channel coefficients can be assumed to be statistically independent zero-mean Gaussian random variables in a Rayleigh fading environment. For a Rician environment (with a line-of-sight path or non-random reflecting paths), the virtual channel coefficients corresponding to line-of-sight (reflecting) paths can be modeled with an appropriate non-zero mean.

In Rayleigh fading, the statistics of H are characterized by the virtual channel power matrix $\Psi:\Psi(m,n)=E[|H_v(m,n)|^2]$. The matrices $A_r$ and $A_t$ constitute the matrices of eigenvectors for the transmit and receive covariance matrices, respectively: $E[H^H H]=A_t\Lambda_t A_t^H$ and $E[HH^H]=A_r\Lambda_r A_r^H$, where $\Lambda_t=E[H_v^H H_v]$ and $\Lambda_r=E[H_v H_v^H]$ are the diagonal matrices of transmit and receive eigenvalues (correlation matrices in the virtual domain). $\Psi$ is the joint distribution of channel power as a function of the transmit and receive virtual angles. $\Lambda_t$ and $\Lambda_r$ are the corresponding marginal distributions:

$$\Lambda_r(m)=\sum_n \Psi(m,n) \text{ and } \Lambda_t(n)=\sum_m \Psi(m,n).$$

An N×N $H_v$ is sparse if it contains $D<N^2$ non-vanishing coefficients. Each non-vanishing coefficient reflects the power contributed by the unresolvable paths associated with it. D reflects the statistically independent DoF in the channel and the channel power $$\rho_c(N)=E[tr(H_v H_v^H)]=\sum_{l=1}^{L} E|B_l|^2=D.$$

In general, the sparser the $H_v$ in the virtual domain, the higher the correlation in the antenna domain H. A sparse $H_v$ can be modeled as $$H_v=M\cdot H_{iid} \tag{6}$$

where · denotes an element-wise product, $H_{iid}$ is an iid matrix with CN(0,1) entries, and M is a mask matrix with D unit entries and zeros elsewhere. Under these assumptions, $\Psi=M$ and the entries of $\Lambda_r$ and $\Lambda_t$ represent the number of non-zero elements in the rows and columns of M, respectively.

The ergodic capacity of a MIMO channel, assuming knowledge of H at the receiver, is given by $$C(N,\rho)=\max_{Tr(Q)\le\rho} E_{H_v}[\mathrm{logdet}(I+H_v Q H_v^H] \tag{7}$$

where ρ is the transmit SNR, and $Q=E[ss^H]$ is the transmit covariance matrix. The capacity-maximizing $Q_{opt}$ is diagonal. Furthermore, for general correlated channels, $Q_{opt}$ is full-rank at high SNR's, whereas it is rank-1 at low SNR's. As ρ is increased from low to high SNR's, the rank of $Q_{opt}$ increases from 1 to N.

The capacity of a sparse virtual channel matrix $H_v$ depends on three fundamental quantities: 1) the transmit SNR ρ, 2) the number of DoF, $D<N^2$, and 3) the distribution of the D DoF in the available $N^2$ dimensions. For any ρ, there is an optimal configuration of the DoF characterized by an optimal mask matrix $M_{opt}$ that yields the highest capacity at that ρ. The corresponding MIMO channel can be termed the IDEAL MIMO channel, and the resulting capacity can be termed the ideal MIMO capacity at that ρ.

Consider a fixed N and $D<N^2$ and let M(D) denote the set of all N×N mask matrices with D non-zero (unit) entries. For any ρ, the ideal MIMO capacity is defined as $$C_{id}(N,D,\rho)=\max_{M\in M(D)} C(N,\rho,M) \tag{8}$$

and an $M_{opt}$ that achieves $C_{id}(N,D,\rho)$ defines the IDEAL MIMO Channel at that ρ.

$M_{opt}$ is not unique in general. The family of mask matrices is defined by two parameters (p,q) such that D=pq. For $D=N^\gamma$, $\gamma\in[0,2]$, the matrices can be further parameterized via $p=N^\alpha$, $\alpha\in[\alpha_{min},\alpha_{max}]$ where $\alpha_{min}=\max(\gamma-1,0)$ and $\alpha_{max}=\min(\gamma,1)$, and q=D/p.

For a given $D=N^\gamma$, $\gamma\in[0,2]$, and any $p=N^\alpha$, $\alpha\in[\alpha_{min},\alpha_{max}]$ the mask matrix M(D,p) is an N×N matrix, but its non-zero entries are contained in a non-zero sub-matrix of size r×p, r=max(q,p), consisting of P non-zero columns, and q non-zero (unit) entries in each column. The corresponding r×p virtual sub-matrices $\tilde{H}_v$ defined by equation (6) satisfy $\rho_c=D$ and their transmit and receive correlation matrices are given by $$\tilde{\Lambda}_t=E[\tilde{H}_v^H\tilde{H}_v]=\frac{D}{p}I_p=qI_p \tag{9}$$

$$\tilde{\Lambda}_r=E[\tilde{H}_v\tilde{H}_v^H]=\frac{D}{r}I_r=\begin{Bmatrix} pI_q, & q\ge p \\ qI_p, & q<p\end{Bmatrix} \tag{10}$$

Since each $\tilde{H}_v$ defines a regular channel, the capacity maximizing input allocates uniform power over the non-vanishing transmit dimensions, $$\tilde{Q}_{opt}=\frac{\rho}{\rho}I_p,$$

and no power in the remaining dimensions. The channel capacity for any M(D,p) is characterized by equation (1) which was derived for large N, but yields accurate estimates even for relatively small N. For sufficiently large N, the capacity of the MIMO channel defined by the mask M(D,p) is accurately approximated as a function of ρ by $$C(N,\rho,M(D,p))\approx p\log\left(1+\rho\frac{D}{p^2}\right) \tag{11}$$

For a given ρ, the IDEAL MIMO Channel is characterized by $M(D,p_{opt})\leftrightarrow p_{opt}$ where $$p_{opt}\approx\begin{Bmatrix} p_{min}, & \rho<\rho_{low} \\ \frac{\sqrt{\rho D}}{2}, & \rho\in[\rho_{low},\rho_{high}] \\ p_{max}, & \rho>\rho_{high}\end{Bmatrix} \text{ and } \tag{12}$$

$$C_{id}(N,D,\rho)=C(N,\rho,M(D,p_{opt})).$$

In equation (12), $p_{min}=N^{\alpha_{min}}$, $p_{max}=N^{\alpha_{max}}$, $\rho_{low}\approx 4p_{min}^{2}/D=4N^{2\alpha_{min}}/D$ and $\rho_{high}\approx 4p_{max}^{2}/D=4N^{2\alpha_{max}}/D$.

Different values of p reveal a multiplexing gain (MG) versus received SNR tradeoff. In equation (11), $$\rho D/p^2 = \frac{E[\|Hs\|^2]}{p} = \rho_{rx}$$

is the received SNR per parallel channel. Thus, increasing the MG comes at the cost of a reduction in $\rho_{rx}$ and vice versa. For $\rho<\rho_{low}$, the optimal BF configuration (FIG. 5; $p=p_{min}$) maximizes $\rho_{rx}$, whereas for $\rho>\rho_{high}$, the optimal MUX configuration (FIG. 3; $p=p_{max}$) maximizes the MG. The optimal IDEAL choice $p_{opt}$ for $\rho\in(\rho_{min},\rho_{max})$ (FIG. 4) reflects a judicious balance between MG and $\rho_{rx}$.

The ratio $\rho_{high}/\rho_{low}=(p_{max}/p_{min})^2$ attains its largest value, $N_2$, for $\gamma=1(D=N)$, whereas it achieves its minimum value of unity for $\gamma=0(D=1)$ or $\gamma=2(D=N^2)$. Thus, the MG-$\rho_{rx}$ tradeoff does not exist for the extreme cases of highly correlated ($\gamma=0$) and iid ($\gamma=2$) channels. On the other hand, the impact of the MG-$\rho_{rx}$ tradeoff on capacity is maximum for $\gamma=1$ corresponding to D=N.

An antenna spacing at the transmitter is denoted $d_t$ and at the receiver is denoted $d_r$. Consider $D=N^{\gamma}$, $\gamma\in[1,2)$ (since for $\gamma\in(0,1)$, it is advantageous to use fewer antennas to effectively increase $\gamma$ to 1). For a given array dimension N, a class H(D) of channels is said to be randomly sparse with D DoF if it contains $L=D<N^2$ resolvable paths that are randomly distributed over the maximum angular spreads or some sufficiently large antenna spacings $d_{t,max}$ and $d_{r,max}$; that is, $(\theta_{r,l},\theta_{t,l})\in[-\frac{1}{2},\frac{1}{2}]\times[-\frac{1}{2},\frac{1}{2}]$ in equation (3).

The maximum antenna spacings correspond to the choice $p=p_{max}=N$ (MUX configuration); that is, $(d_{t,max},d_{r,max})\leftrightarrow p_{max}$. For any p, $p_{min}\leqq p\leqq p_{max}$ define the antennas spacings $$d_t = \frac{pd_{t,max}}{N}, \qquad d_r = \frac{rd_{r,max}}{N} \tag{13}$$

where r=max(q,p) and q=D/p. As a result, for each p, the non-vanishing entries of the resulting $H_v$ are contained within an r×p sub-matrix $\tilde{H}_v$ with power matrix $$\tilde{\Psi} = \frac{D}{pr}1_{r\times p}.$$

Furthermore, the transmit and receive correlation matrices, $\tilde{\Lambda}_t$ and $\tilde{\Lambda}_r$, respectively, of $\tilde{H}_v$ match those generated by the mask matrix M(D,p).

By way of a proof, for a given scattering environment, the channel power does not change with antenna spacing. By assumption we have $\rho_c=\mathrm{tr}(E[H_vH_v^H])=D$. Also by assumption, the D randomly distributed paths cover maximum angular spreads (AS's) at the maximum spacings. Since $\theta=d\sin(\phi)/\lambda$, where $\phi$ is the physical angle associated with a path (which remains unchanged), the $d_r$ and $d_t$ in (11) result in smaller AS's: {−p/2N,p/2N] at the transmitter and [−r/2N,r/2N] at the receiver. Since the spacing between virtual angles is $\Delta\theta=1/N$, it follows that only $p=p/N/\Delta\theta$ virtual angles lie within the reduced AS at the transmitter and only r virtual angles lie within the reduced angular spread at the receiver. Thus, the non-zero entries in $H_v$ are contained in a sub-matrix $\tilde{H}_v$ of size r×p. The channel power $\rho_c=D$ is uniformly distributed over its entries so that $$E\left[|\tilde{H}_v(m,n)|^2\right] = \frac{D}{rp},\ \tilde{\Lambda}_r = E\left[\tilde{H}_v\tilde{H}_v^H\right] = (D/r)I_r \text{ and}$$

$$\tilde{\Lambda}_t = E\left[\tilde{H}_v^H\tilde{H}_v\right] = qI_p,$$

where the expectation is over the statistics of the D non-vanishing coefficients as well as their random locations. The power matrix of the reconfigured channel corresponding to the spacings in (13) satisfies: $\Psi=M(D,p)$ for $p\leqq\sqrt{D}(q\geqq p)$, but $\Psi\neq M(D,p)$ for $p>\sqrt{D}(q<p)$.

In randomly sparse physical channels, the virtual channel matrix generated by reconfiguring antenna spacings has identical statistics (marginal and joint) to those generated by the mask matrix M(D,p) for $P\leqq q$, but only the marginal statistics are matched for p>q. It follows that the reconfigured channel achieves the capacity corresponding to M(D,p) for $P\leqq q$, but the capacity may deviate a little for p>q especially at high SNR's since the reconfigured channel always has a kronecker (separable) structure whereas M(D,p) is non-separable for p>q. With this qualification, in randomly sparse physical channels, the (capacity maximizing) IDEAL MIMO channel at any transmit SNR can be created by choosing $d_{r,opt}$ and $d_{t,opt}$ in (13) corresponding to $p_{opt}$ defined in (12).

Figure 9A:
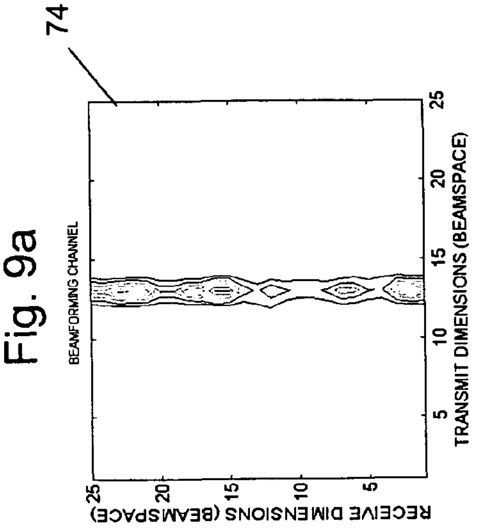
FIG. 9*a* is a contour plot of a virtual channel power matrix for a third channel configuration in accordance with an exemplary embodiment.
Figure 9B:
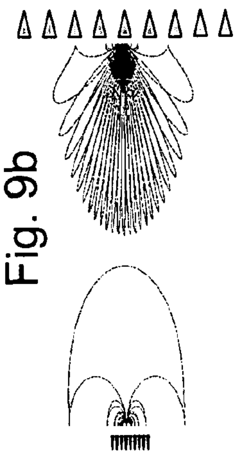
FIG. 9*b* illustrates the third channel configuration in accordance with an exemplary embodiment.
Figure 8A:
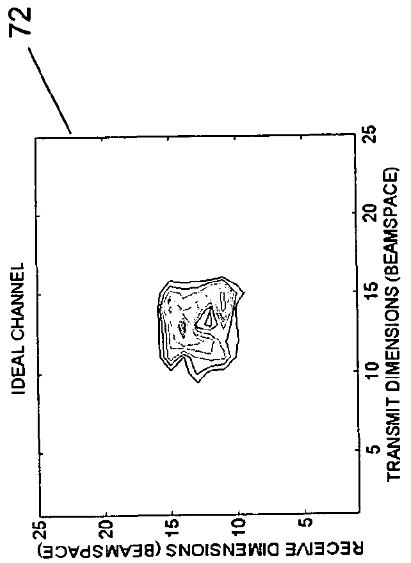
FIG. 8*a* is a contour plot of a virtual channel power matrix for a second channel configuration in accordance with an exemplary embodiment.
Figure 8B:
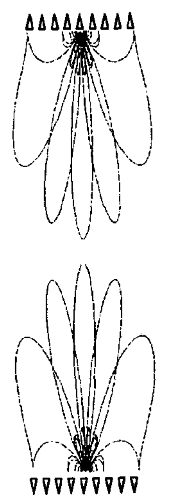
FIG. 8*b* illustrates the second channel configuration in accordance with an exemplary embodiment.
Figure 7A:
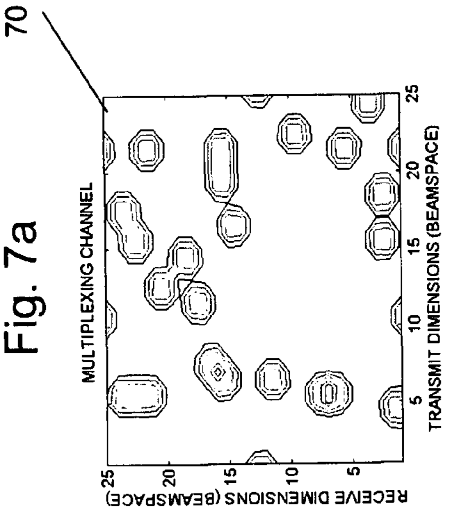
FIG. 7*a* is a contour plot of a virtual channel power matrix for a first channel configuration in accordance with an exemplary embodiment.
Figure 7B:
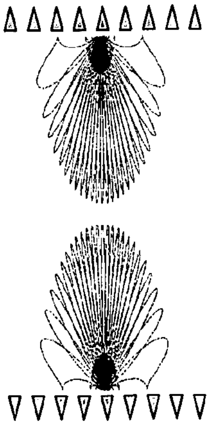
FIG. 7*b* illustrates the first channel configuration in accordance with an exemplary embodiment.
Figure 10:
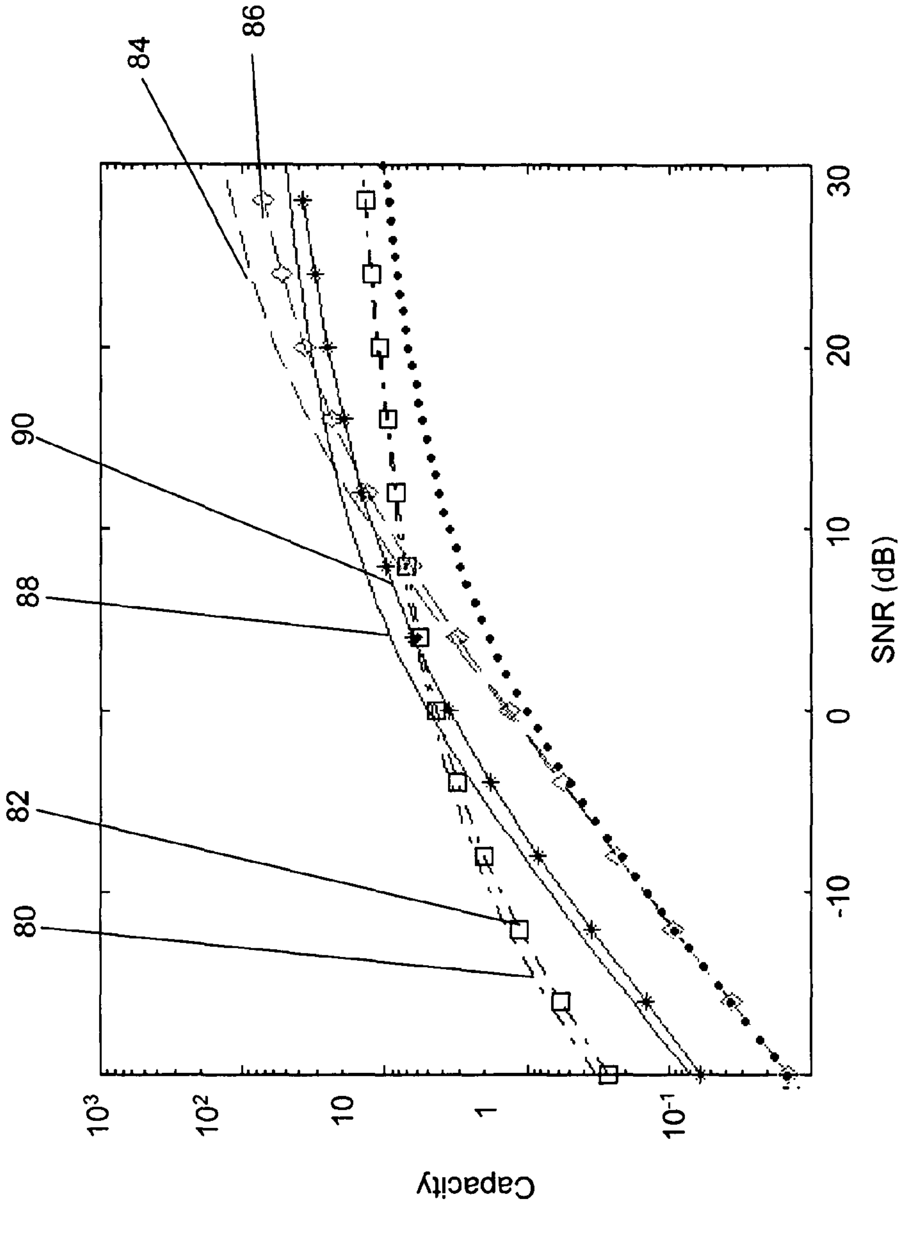
FIG. 10 is a graph illustrating a simulated capacity of the communication system as a function of a signal-to-noise ratio for the first, second, and third channel configurations of FIGS. 7-9 in accordance with an exemplary embodiment.

Three channel configurations are highlighted in FIGS. 7*b*, 8*b*, and 9*b* corresponding to N=D=25: BF (FIG. 9*b*): $H_{v,bf}\leftrightarrow p_{bf}=p_{min}=1$, the transmitter array is in a low-resolution configuration (FIG. 5) and receiver array is in a high-resolution configuration (FIG. 3); IDEAL (FIG. 8*b*): $H_{v,id}\leftrightarrow p_{id}=\sqrt{D}=\sqrt{N}$, both the transmitter and receiver arrays are in a medium-resolution configuration (FIG. 4); and MUX (FIG. 7*b*): $H_{v,mux}\leftrightarrow p_{mux}=p_{max}=N$, both the transmitter and receiver arrays are in a high-resolution configuration (FIG. 3). The BF and MUX configurations represent the IDEAL MIMO Channel for $\rho<\rho_{low}$ and $\rho>\rho_{high}$, respectively. The IDEAL configuration is a good approximation to the IDEAL MIMO channel for $\rho\in(\rho_{low},\rho_{high})$. Thus, from a practical viewpoint, these three configurations suffice for adapting array configurations to maximize capacity over the entire SNR range.

With reference to FIG. 7*a*, a first contour plot 70 of a virtual channel power matrix for the MUX configuration of FIG. 7*b* is shown. With reference to FIG. 8*a*, a second contour plot 72 of a virtual channel power matrix for the IDEAL configuration of FIG. 8*b* is shown. With reference to FIG. 9*a*, a third contour plot 74 of a virtual channel power matrix for the BF configuration of FIG. 9*b* is shown. First contour plot 70 was determined using N=D=25($\gamma$=1) as illustrated in FIG. 7*b*. The AoA's and AoD's $(\theta_{r,l},\theta_{t,l})\in[-\frac{1}{2},\frac{1}{2}]^2$ were generated for L=25 paths, where the AoA/AoD's of different paths were randomly distributed over the entire angular spread. This defined an $H_{mux}$ environment for $d_{t,mux}=d_{r,mux}=d_{max}=\lambda/2$ without loss of generality. The AoA/AoD's were fixed, and the capacities of the three channel configurations were estimated using 200 realizations of the scattering environment simulated from equation (3) by independently generating CN(0,1)-distributed complex path gains. The random locations of the D paths are illustrated in FIG. 7*a*, which shows first contour plot 70 of $\Psi_{mux}$. Using equation (13), the spacings for $H_{v,bf}$ were defined as $d_{t,bf}=d_{t,mux}/N$ as shown in FIG. 5 and $d_{r,bf}=d_{r,mux}$ as shown in FIG. 3. The spacings for $H_{id}$ were defined as $d_{t,id}=d_{r,id}=d_{r,mux}/\sqrt{N}$ as shown in FIG. 4. Second contour plot 72 of the resulting $\Psi_{id}$ is illustrated in FIG. 8*a*. Third contour plot 74 of the resulting $\Psi_{bf}$ is illustrated in FIG. 9*a*. The numerically estimated capacities for the three configurations, corresponding to the theoretically optimal uniform-power inputs are plotted in FIG. 210 along with the theoretical curves calculated using equation (11). A first curve 80 and a second curve 82 depict results for a BF configuration. First curve 80 illustrates the theoretical values calculated based on equation 11. Second curve 82 illustrates the numerically estimated capacities calculated based on equations (12) and (13). A third curve 84 and a fourth curve 86 depict results for a MUX configuration. Third curve 84 illustrates the theoretical values calculated based on equation 11. Fourth curve 86 illustrates the numerically estimated capacities calculated based on equations (12) and (13). A fifth curve 88 and a sixth curve 90 depict results for an IDEAL configuration. Fifth curve 88 illustrates the theoretical values calculated based on equation 11. Sixth curve 90 illustrates the numerically estimated capacities calculated based on equation equations (12) and (13).

The effect of decreasing $d_r$ with ρ is to concentrate channel power in fewer non-vanishing transmit dimensions. As a result, the number of non-vanishing transmit eigenvalues is reduced, but their size is increased. This reflects a form of source-channel matching: the rank of the optimal input is better-matched to the rank of $H_v$. As a result, less channel power (none for regular channels) is wasted as the multiplexing gain is optimally reduced through $d_r \leftrightarrow p$. Physically, as $d_r$ is decreased, fewer data streams (p) are transmitted over a corresponding number of spatial beams, whereas the width of the beams gets wider (see FIGS. 3-5). In effect, for any p, N/p closely spaced antennas coherently contribute to each beam to sustain a constant power over the N/p-times wider beamwidth.

Figure 11:
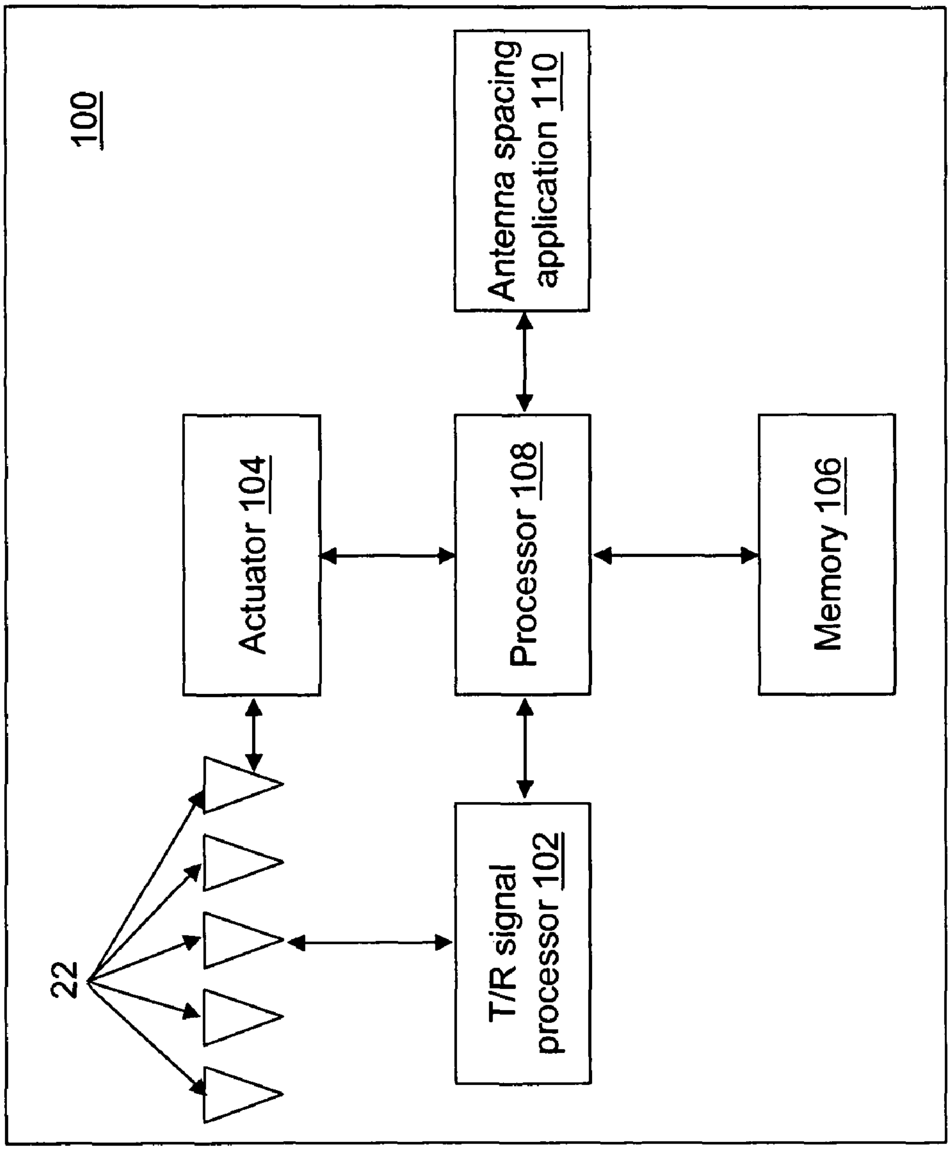
FIG. 11 is a block diagram of an exemplary device in accordance with an exemplary embodiment.

With reference to FIG. 11, an exemplary device 100 is shown. Device 100 may include the plurality of antennas 22, a transmit/receive (T/R) signal processor 102, an actuator 104, a memory 106, a processor 108, and an antenna spacing application 110. Different and additional components may be utilized by device 100. For example, device 100 includes one or more power source that may be a battery. In an additional embodiment, device 100 may include a remote connection to the plurality of antennas 22. The output of the plurality of antennas 22 may be any appropriate signals, such as spread-spectrum signals, short broadband pulses or a signal synthesized from multiple discrete frequencies, from a frequency swept (chirp) pulse, etc.

T/R signal processor 102 forms the transmitted signals s(t) transmitted from each antenna of the plurality of antennas 22. 22 in the transmitting device. In a receiving device, the processor 102 determines the way in which the signals received on the plurality of antennas 22 are processed to decode the transmitted signals from the transmitting device, for example, based on the modulation and encoding used at the transmitting device. Actuator 104 adjusts an antenna spacing of the plurality of antennas 22 based on the determined optimum antenna spacing. For example, actuator 104 adjusts the antenna spacing based on equation (13). The actuators may be based on any available or emerging technology for reconfiguring the array configuration (antenna spacing for uniform linear arrays), such as MEMS technology. For arrays other than uniform linear arrays, the array reconfiguration may be based on other mechanisms related to the possible radiation patterns (e.g., appropriate excitations in a fractal array).

Memory 106 stores antenna spacing application 110, in addition to other information. Device 100 may have one or more memories 106 that uses the same or a different memory technology. Memory technologies include, but are not limited to, random access memory, read only memory, flash memory, etc. In an alternative embodiment, memory 106 may be implemented at a different device.

Processor 108 executes instructions that may be written using one or more programming language, scripting language, assembly language, etc. The instructions may be carried out by a special purpose computer, logic circuits, or hardware circuits. Thus, processor 108 may be implemented in hardware, firmware, software, or any combination of these methods. The term "execution" is the process of running an application or the carrying out of the operation called for by an instruction. Processor 108 executes antenna spacing application 110 and/or other instructions. Device 100 may have one or more processors 108 that use the same or a different processing technology. In an alternative embodiment, processor 108 may be implemented at a different device.

Antenna spacing application 110 is an organized set of instructions that, when executed, cause device 100 to determine an antenna spacing. Antenna spacing application 110 may be written using one or more programming language, assembly language, scripting language, etc. In an alternative embodiment, antenna spacing application 110 may be executed and/or stored at a different device.

Determining the capacity-optimal channel configuration may include use of channel sounding. Two channel parameters can be determined through channel sounding: 1) the total received signal power as a function of the total transmitted signal power to determine the operating SNR (this accounts for the path loss encountered during propagation and the total power contributed by the multiple paths in the scattering environment), and 2) the number of dominant non-vanishing entries in the virtual channel matrix. Knowledge of 2) can lead to the determination of 1). With reference to 2), a variety of channel sounding/estimation methods may be used. For example, in the method proposed in Kotecha and Sayeed, "Transmit Signal Design for Optimal Estimation of Correlated MIMO Channels," IEEE Transactions on Signal Processing, February 2002, training signals are transmitted sequentially on different virtual transmit beams at the first (transmitting device) and the entries in the corresponding column of the virtual channel matrix $H_v$ are estimated by processing the signals in the different virtual beam directions at the second (receiving) device. In this fashion, channel coefficients in different columns of the virtual channel matrix are sequentially estimated at the receiving device from the sequential transmissions in different virtual directions from the transmitting device.

By performing channel sounding (estimation of the virtual channel matrix entries) a sufficient number of times, the average power in different virtual channel coefficients can be estimated to form an estimate of the virtual channel power matrix $\Psi$. Once the virtual channel power matrix $\Psi$ is estimated, the effective operating SNR can be directly estimated from the total channel power (sums of all the entries in the power matrix) and includes the impact of path loss by comparing the total transmitted power to the total received power. From the virtual channel power matrix $\Psi$, the dominant number of entries in the power matrix can be estimated by comparing to an appropriately chosen threshold (to discount virtual channel coefficients with insignificant power) yielding the number of degrees of freedom D in the channel.

Based on knowledge of D, the optimal array configurations can be determined at any desired operating SNR via equations (12) and (13). The maximum antenna spacings in equation (13) defining the reference MUX configuration are determined from the physical angular spread of the scattering environment (the spacings are adjusted so that the physical channel exhibits maximum angular spread in the virtual (beamspace) domain). The estimation of the channel power matrix is performed at the receiving device, and the value of D is transmitted back to the transmitting device so that the optimum transmit array configuration can be chosen for a given operating SNR. The receiving device also configures its array configuration according to D and the operating SNR. The procedure discussed above is implicitly based on a scattering environment in which the paths are randomly and uniformly distributed over the angular spreads. Appropriate modifications may be made for non-uniform distribution of scattering paths by those knowledgeable in the art for further enhancements in performance.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A device comprising:

a plurality of antennas, the plurality of antennas adapted to transmit a first signal toward a receiver; and to receive a second signal from the receiver; and a processor operably coupled to receive the second signal from the plurality of antennas, the processor configured to determine a number of spatial degrees of freedom from the received second signal;

to determine an operating signal-to-noise ratio; and to calculate an antenna spacing between the plurality of antennas based on the determined number of spatial degrees of freedom and the determined operating signal-to-noise ratio.

2. The device of claim 1, further comprising an actuator, the actuator operably coupled to the processor and configured to adjust a position of the plurality of antennas based on the determined antenna spacing.

3. A method of dynamically determining an antenna spacing in a multi-antenna system, the method comprising:

estimating a number of spatial degrees of freedom associated with a channel;

estimating an operating signal-to-noise ratio associated with the channel; and calculating an antenna spacing between a plurality of antennas based on the estimated number of spatial degrees of freedom and the estimated operating signal-to-noise ratio associated with the channel.

4. The method of claim 3, wherein a first device includes the plurality of antennas.

5. The method of claim 4, wherein a second device comprises a second plurality of antennas.

6. The method of claim 5, further comprising calculating a second antenna spacing between the second plurality of antennas based on the estimated number of spatial degrees of freedom and the estimated operating signal-to-noise ratio.

7. The method of claim 6, further comprising determining a multiplexing gain, wherein calculating the second antenna spacing is further based on the determined multiplexing gain.

8. The method of claim 7, wherein calculating the second antenna spacing comprises use of a parameter, where, is the determined number of spatial degrees of freedom, is the determined multiplexing gain, is a maximum antenna spacing, and is the number of the second plurality of antennas.

9. The method of claim 8, wherein, if the estimated operating signal-to-noise ratio is approximately less than a first signal-to-noise ratio threshold, is approximately equal to a first multiplexing gain threshold.

10. The method of claim 8, wherein, if the estimated operating signal-to-noise ratio is approximately greater than a second signal-to-noise ratio threshold, is approximately equal to a second multiplexing gain threshold.

11. The method of claim 8, wherein, if the estimated operating signal-to-noise ratio is approximately greater than or equal to a first signal-to-noise ratio threshold and is approximately less than or equal to a second signal-to-noise ratio threshold, is approximately equal to, where is the estimated operating signal-to-noise ratio.

12. The method of claim 3, wherein the plurality of antennas form a linear array.

13. The method of claim 3, wherein, if the estimated operating signal-to-noise ratio is approximately less than a first signal-to-noise ratio threshold, the calculated antenna spacing is approximately equal to a minimum antenna spacing.

14. The method of claim 3, wherein, if the estimated operating signal-to-noise ratio is approximately greater than a first signal-to-noise ratio threshold, the calculated antenna spacing is approximately equal to a maximum antenna spacing.

15. The method of claim 3, wherein, if the estimated operating signal-to-noise ratio is approximately greater than a first signal-to-noise ratio threshold and approximately less than a second signal-to-noise ratio threshold, the calculated antenna spacing is greater than a minimum antenna spacing and less than a maximum antenna spacing.

16. The method of claim 3, further comprising determining a multiplexing gain, wherein calculating the antenna spacing is further based on the determined multiplexing gain.

17. The method of claim 16, wherein calculating the antenna spacing comprises use of a parameter, where is the determined multiplexing gain, is a maximum antenna spacing, and is the number of the plurality of antennas.

18. The method of claim 17, wherein, if the estimated operating signal-to-noise ratio is approximately less than a first signal-to-noise ratio threshold, is approximately equal to a first multiplexing gain threshold.

19. The method of claim 17, wherein, if the estimated operating signal-to-noise ratio is approximately greater than a second signal-to-noise ratio threshold, is approximately equal to a second multiplexing gain threshold.

20. The method of claim 17, wherein, if the estimated operating signal-to-noise ratio is approximately greater than or equal to a first signal-to-noise ratio threshold and is approximately less than or equal to a second signal-to-noise ratio threshold, is approximately equal to, where is the estimated operating signal-to-noise ratio and is the estimated number of spatial degrees of freedom.

21. The method of claim 3, wherein the number of spatial degrees of freedom is estimated using a channel sounding signal.

22. The method of claim 3, wherein the operating signal-to-noise ratio is estimated using a channel sounding signal.

23. A computer-readable medium having computer-readable instructions stored thereon that, upon execution by a processor, cause a computing device to calculate an antenna spacing between a plurality of antennas based on a number of spatial degrees of freedom estimated for a channel and an operating signal-to-noise ratio estimated for the channel.

24. A communication system, the communication system comprising:

a first device, the first device comprising a plurality of antennas, the plurality of antennas adapted to transmit a first signal toward a second device; and to receive a second signal from the second device; and a first processor operably coupled to receive the second signal from the plurality of antennas, the first processor configured to determine a number of spatial degrees of freedom from the received second signal;

to determine an operating signal-to-noise ratio; and to calculate an antenna spacing between the plurality of antennas based on the determined number of spatial degrees of freedom and the determined operating signal-to-noise ratio; and the second device comprising a receiver adapted to receive the first signal from the first device;

a second processor operably coupled to receive the first signal from the receiver, the second processor configured to estimate the number of spatial degrees of freedom from the received first signal; and to estimate an operating signal-to-noise ratio from the received first signal; and a transmitter adapted to transmit the second signal toward the first device, the second signal including the estimated number of spatial degrees of freedom and the estimated operating signal-to-noise ratio.

* * * * *

UNITED STATES PATENT AND TRADEMARK OFFICE
CERTIFICATE OF CORRECTION

PATENT NO. : 8,000,730 B2
APPLICATION NO. : 11/482530
DATED : August 16, 2011
INVENTOR(S) : Akbar M. Sayeed et al.

It is certified that error appears in the above-identified patent and that said Letters Patent is hereby corrected as shown below:

IN THE SPECIFICATION

Col. 9, line 19

Delete "$N_2$" and replace with -- $N^2$ --

IN THE CLAIMS

Col. 13, line 64-67 (Claim 8)

Delete "use of a parameter, where, is the determined number of spatial degrees of freedom, is the determined multiplexing gain, is a maximum antenna spacing, and is the number of the second plurality of antennas." and replace with -- use of a parameter $\frac{rd_{max}}{N}$, where $r = \max(D/p, p)$, $D$ is the determined number of spatial degrees of freedom, $p$ is the determined multiplexing gain, $d_{max}$ is a maximum antenna spacing, and $N$ is the number of the second plurality of antennas. --

Col. 14, line 2-4 (Claim 9)

Delete "first signal-to-noise ratio threshold, is approximately equal to a first multiplexing gain threshold." and replace with -- first signal-to-noise ratio threshold, $p$ is approximately equal to a first multiplexing gain threshold. --

Signed and Sealed this
Twenty-second Day of November, 2011

David J. Kappos
*Director of the United States Patent and Trademark Office*

IN THE CLAIMS

Col. 14, line 7-8 (Claim 10)

Delete "second signal-to-noise ratio threshold, is approximately equal to a second multiplexing gain threshold." and replace with -- second signal-to-noise ratio threshold, $p$ is approximately equal to a second multiplexing gain threshold. --

Col. 14, line 12-14 (Claim 11)

Delete "second signal to-noise-ratio threshold, is approximately equal to, where is the estimated operating signal-to-noise ratio." and replace with -- second signal-to-noise ratio threshold, $p$ is approximately equal to $\frac{\sqrt{\rho D}}{2}$, where $p$ is the estimated operating signal-to-noise ratio. --

Col. 14, line 37-39 (Claim 17)

Delete "use of a parameter, where is the determined multiplexing gain, is a maximum antenna spacing, and is the number of the plurality of antennas." and replace with -- use of a parameter $\frac{pd_{max}}{N}$, where $p$ is the determined multiplexing gain, $d_{max}$ is a maximum antenna spacing, and $N$ is the number of the plurality of antennas. --

Col. 14, line 42-43 (Claim 18)

Delete "first signal-to-noise ratio threshold, is approximately equal to a first multiplexing gain threshold." and replace with -- first signal-to-noise ratio threshold, $p$ is approximately equal to a first multiplexing gain threshold. --

Col. 14, line 46-47 (Claim 19)

Delete "second signal-to-noise ratio threshold, is approximately equal to a second multiplexing gain threshold." and replace with -- second signal-to-noise ratio threshold, $p$ is approximately equal to a second multiplexing gain threshold. --

IN THE CLAIMS

Col. 14, line 51-54 (Claim 20)

Delete "second signal-to-noise ratio threshold, is approximately equal to, where is the estimated operating signal-to-noise ratio and is the estimated number of spatial degrees of freedom." and replace with -- second signal-to-noise ratio threshold, *p* is approximately equal to $\frac{\sqrt{\rho D}}{2}$, where $\rho$ is the estimated operating signal-to-noise ratio and $D$ is the estimated number of spatial degrees of freedom. --